Patented July 13, 1954

2,683,721

UNITED STATES PATENT OFFICE 2,683,721

METHOD OF REDUCING AND HYDROGENATING CHEMICAL COMPOUNDS BY REACTING WITH ALKALI METAL BOROHYDRIDES

Hermann I. Schlesinger, Chicago, Ill., and Herbert C. Brown, Lafayette, Ind.

No Drawing. Application January 17, 1952, Serial No. 267,005

21 Claims. (Cl. 260—343.3)

This invention relates to methods of reducing and hydrogenating chemical compounds by reacting these compounds with an alkali metal borohydride.

This application is a continuation-in-part of our copending application Serial No. 63,202, filed December 2, 1948, now abandoned, which in turn was a continuation-in-part of application Serial No. 48,314, filed September 8, 1948 and now abandoned.

The alkali metal borohydrides of this invention include all of those boron compounds having an alkali metal associated with a group consisting of a boron atom and at least one and up to four reactive hydrogen atoms. When there are less than four hydrogen atoms, the group containing the boron atom may contain one to three atoms other than hydrogen or one to three radicals, which atoms or radicals are relatively inert and non-reactive with respect to the reducing action characteristic of the hydrogen atoms of these compounds, or a combination of such atoms other than hydrogen and radicals so long as at least one hydrogen atom is present and so long as the total number of atoms including hydrogen and radicals is four. Thus the compounds of this invention have the formula $MBH_{4-x}A_x$ where $x$ is a whole number less than four and includes zero, and each A is an atom or radical, which atom or radical is relatively inert with respect to the reducing action characteristic of the hydrogen atoms of these compounds and which does not interfere with such reducing reaction. When $x$ is greater than one, the A radicals or atoms need not all be the same. Thus the borohydrides include the compounds $MBH_4$, $MBH_3A$, $MBH_2A_2$ and $MBHA_3$. The substituent A is an atom or radical as defined above. The preferred substituents are alkyl, aryl or alkoxy groups, or a halide atom such as fluorine.

The general term "alkali metal borohydride" is used herein to include all such compounds while specific compounds will be identified as the simple borohydride when $x$ is zero and thus four hydrogen atoms are present in the molecule and as the substituted borohydride when at least one A is present so that $x$ is 1, 2 or 3. Thus, $NaBH_4$ is the simple sodium borohydride, $NaBH(C_2H_5)_3$ is the triethylborohydride, $NaBH(OCH_3)_3$ is the trimethoxyborohydride, $NaBH(C_6H_5)_3$ is the triphenylborohydride, and $NaBHF_3$ is the trifluoroborohydride. In the examples the specific borohydrides named are the simple borohydrides unless in naming the boron compound a substituent is indicated.

The alkali metal borohydrides which do not contain substituents and their methods of preparation are described and claimed in our prior U. S. Patent 2,534,533 dated December 19, 1950. The alkali metal alkoxyborohydrides are described and claimed in our Patent 2,494,968 dated January 17, 1950.

The simple sodium borohydride is a solid that is stable in dry air and reacts only very slowly with moisture in moist air. It may be heated in vacuo to above 400° C. without noticeable decomposition and is very soluble in water. It reacts with water to liberate hydrogen, but the liberation of hydrogen is very slow if the water is at room temperature or lower. The simple lithium borohydride reacts much more rapidly with water and also serves to liberate hydrogen. Various methods of preparing these simple borohydrides have been described and claimed in the above-mentioned Patent 2,534,533. One of these methods is by treating an alkali metal hydride with an alkyl borate. These simple borohydrides may also be prepared by heating an alkali metal hydride with an alkali metal alkoxyborohydride. Another method of preparation is by heating mixtures of an alkali metal and an alkyl borate with hydrogen under pressure. A further method of preparing these simple borohydrides is to heat an alkali metal hydride with boric oxide.

We have found that both the simple and substituted lithium and sodium borohydrides are excellent hydrogenating (reducing) agents for many types of organic compounds. The properties and characteristics of the corresponding potassium compounds are, with a few minor differences, like those of the sodium compounds.

As is pointed out in the above Patent 2,494,968, the alkali metal trialkoxyborohydrides may be prepared by reacting an alkali metal hydride with an alcohol ester of boric acid at lower temperatures and in different proportions from those required for the simple borohydride. Similarly, other substituted borohydrides can be prepared by reacting the alkali metal hydride MH with the substituted boron compound $BA_3$ where at least one A is a substituent as defined above. Other types of substituted borohydrides may be prepared by disproportionation of trisubstituted borohydrides.

Although chemical compounds which liberate hydrogen are in general good reducing agents, there is no way of predicting the types of compounds that will be reduced. For example, sodium, magnesium, zinc and even tin liberate hydrogen with water or acids. Each of these substances reacts differently toward reducible compounds since the reduction potentials of the hydrogen liberating metals are different. As the reduction potentials of alkali metal borohydrides were not known prior to our work with these materials, there was no way of predicting the types of compounds that would be reduced with alkali metal borohydrides. Even now these reduction potentials of alkali metal borohydrides are not known with any degree of accuracy. Furthermore, the effectiveness of a reducing agent depends not only on its reduction potential but also on the rate at which reductions proceed and such rates cannot be predicted. It therefore had to be determined what kind of reductions would be produced by the alkali metal borohydrides. The liberation of hydrogen is not an essential part of the reducing action. This is shown by the fact that the compounds of this invention react as reducing agents in solvents such as the primary amines, but they do not liberate hydrogen therefrom. Furthermore, sodium borohydride liberates hydrogen from water very slowly and the reaction becomes exceedingly slow after a few minutes when the solution has become moderately alkaline. Nevertheless the reducing is usually quite rapid and complete. No other readily available hydrides that are active as reducing agents can be used in all the solvents and carriers in which the alkali metal borohydrides are effective.

The alkali metal borohydrides are particularly useful as they may be employed as reducing agents in a variety of solvents. Thus, certain of the borohydrides may be employed in aqueous solutions, in solution in other solvents, suspended in a liquid carrier, or dissolved or suspended in the chemical compound that is to be reduced. Typical solvents other than water include: liquid ammonia; primary and secondary amines such as methyl amine, ethyl amine, isopropyl amine, diethylamine, ethylene diamine, pyridine and derivatives of such amines containing ether linkages; and alcohols, particularly aliphatic alcohols such as methyl, ethyl and isopropyl alcohol, as well as alcohols containing ether or amine linkages or both. Certain of the alkali metal borohydrides may also be employed in suspension in an ether or other carrier. Lithium borohydride may be used in these solvents as well as in many ethers in which sodium borohydride does not dissolve. If aqueous solutions are to be used, the sodium borohydride is preferred since the initial reaction of lithium borohydride with water is very vigorous even though it soon subsides. The vigor of this initial reaction may be decreased by employing alkaline solutions rather than pure water as a solvent. If lithium borohydride is used in aqueous solution, it is preferable to exclude air during its addition to aqueous solutions or to water. On the other hand, lithium borohydride is preferred where compounds soluble in ethers, but not soluble in water, are to be reduced or when the presence of water or basic substances cause undesirable side reactions.

In general, the solvents and carriers that may be used cover a wide range. As has been pointed out, even those liquids such as ethers in which the particular alkali metal borohydride such as sodium alkoxyborohydride is not soluble may be used by merely suspending the borohydride in the liquid. The reductions may be accomplished without the use of an added solvent or carrier when the chemical compounds that are reduced are themselves liquid at the reaction temperature. Here the alkali metal borohydride is merely mixed with the liquid chemical compound and no added solvent or other medium is necessary. The versatility of the alkali metal borohydrides with respect to the variety of solvents in which they may be selectively used and with respect to the great variety of substances which they reduce rapidly at low or moderate temperatures with good yields are among the chief advantages of their use.

The alkali metal borohydrides described herein are useful in reducing or hydrogenating a chemical compound containing a reducible functional group including an atom other than hydrogen and carbon. They are particularly effective for selective hydrogenations or reductions. Thus, it is possible to hydrogenate an aldehyde, ketone, acid chloride, acid anhydride, or ester group in the presence of double or triple bonds without simultaneously hydrogenating the double or triple bond. Even more remarkable is the fact that these reagents permit the hydrogenation of an aldehyde or ketone group in a molecule without simultaneously hydrogenating another functional group such as an ester, amide, nitrile or nitro groups which may also be present in the same molecule. Moreover, an acid chloride group for example, is readily hydrogenated and can be hydrogenated to either the aldehyde stage or the alcohol stage without simultaneously hydrogenating at other points such as at double bonds or ester, amide, nitrile or nitro groups. As can be seen therefore, these new reagents permit hydrogenation of selected groups in large organic molecules containing more than one functional group. They therefore facilitate the synthesis of large poly-functional molecules such as are of importance in the pharmaceutical field as well as in the field of natural products.

The reductions by means of the alkali metal borohydrides according to this invention sometimes lead to the formation of intermediate products which are then hydrolyzed to obtain the desired end product. Even when water is present as a solvent or carrier, it is sometimes necessary to raise the temperature in order to accomplish this result. Water is also sometimes added at the end of the reaction in order to remove excess borohydride.

The following examples are used for illustration purposes only to show the remarkable versatility and selectivity of the borohydrides in hydrogenating organic compounds.

*The hydrogenation of butyraldehyde*

Sodium borohydride, 38 g. (1.00 mole) is dissolved in 500 ml. cold water and placed in a 2-liter round-bottomed flask fitted with a stirrer, a condenser, and a dropping funnel. In the dropping funnel is placed 328 g. of freshly distilled n-butyraldehyde (4.00 mole) and the aldehyde is added slowly over a period of four hours to the flask maintained at 25° C. After all of the aldehyde is added, the reaction mixture is stirred for an additional two hours. The upper organic layer is separated from the lower aqueous layer, washed with several small portions of water, and distilled. There is obtained 270 g. of n-butyl alcohol, B. P. 115–118°, $n_D^{25}$ 1.3977.

*The hydrogenation of benzaldehyde*

In a 1-liter round-bottomed flask fitted with a condenser and stirrer is placed 53 g. (0.50 mole) of freshly distilled benzaldehyde dissolved in 200 g. methanol. To the reaction mixture is added 9.5 g. (0.25 mole) of sodium borohydride in small quantities over a period of one hour, the mixture is permitted to stand for two additional hours until hydrogen evolution has ceased. The reaction mixture is then poured into 500 ml. of water, stirred thoroughly, and the upper organic layer is separated. The lower aqueous layer is extracted with several portions of ether and the either extract is added to the organic layer previously separated. The combined organic material is dried over calcium hydride and then distilled through a Vigreaux column. The benzyl alcohol is collected at 95° at 11 mm., $n_D^{25}$ 1.5375. The yield is 48 g., 90% of the calculated.

The hydrogenation of cinnamaldehyde

In a 3-neck 1-liter round-bottomed flask fitted with a stirrer, condenser and dropping funnel, is placed 64 g. of sodium trimethoxyborohydride (0.50 moles). In the dropping funnel is placed 66 g. (0.50 mole) of freshly distilled cinnamaldehyde in 200 ml. of diethyl ether. The solution is slowly added to the reaction flask at such a rate as to maintain the ether at a gentle reflux. After all of the aldehyde is added, the flask is gently heated for two additional hours. The reaction mixture is allowed to cool to room temperature and 200 ml. of water is added carefully. The reaction mixture is poured into 1-liter separatory funnel and the upper ether layer is separated and dried over sodium sulfate. The ether is removed by distillation over a steam cone and the product is distilled under vacuum in a distilling flask equipped with a short Vigreaux column. The product cinnamyl alcohol is collected at 133–137° at 13 mm., $n_D^{20}$ 1.5825. The yield is 57 g., 85% of theoretical. The value of the refractive index indicates the absence of any but possible traces of hydrocinnamyl alcohol.

The same reduction can be carried out with lithium borohydride dissolved in ether, potassium borohydride and sodium triethoxyborohydride either dissolved in ethanol or suspended in ethyl ether.

The hydrogenation of chloral

In a 1-liter, round-bottomed flask is placed 2.2 g. (0.10 mole) of lithium borohydride and 200 ml. of anhydrous ether. In the dropping funnel is placed 58 g. (0.40 mole) chloral dissolved in 100 ml. ethyl ether. The chloral solution is added slowly to the reaction mixture. There is a vigorous reaction and the ether refluxes. The addition is maintained at such a rate as to maintain the ether at a gentle reflux. After all of the chloral has been added, the reaction mixture is heated under reflux for an additional two hours and 300 ml. of water is then added. The ether layer is separated. The aqueous layer is extracted with several additional portions of ether. The combined ether extracts are dried over sodium sulfate and the ether removed by distillation over a steam cone. The product is then recovered by distillation from a Claisen flask in vacuum. β-, β-, β-Trichloroethanol, B. P. 147–151°, M. P. 16–17°, is obtained in 70% yield, 41 g.

The hydrogenation of benzoyl chloride

In a 1-liter round-bottomed flask is placed 100 ml. of purified dioxane and 7.6 g. (0.20 mole) of sodium borohydride. The reaction mixture is cooled, and to the suspension is added a solution of benzoyl chloride, 28 g. (0.20 mole) in 100 ml. of the solvent. After addition is complete, the reaction mixture is refluxed gently for two hours. The reaction mixture is cooled and water added to decompose the excess sodium borohydride. This mixture of water and dioxane is distilled off at atmospheric pressure. Water is added to the residue to dissolve the salts, the organic material is taken up in ether. Distillation of the ether extract yields 15 g. benzyl alcohol, 70% yield, $n_D^{25}$ 1.5373, B. P. 93–96° at 11 mm.

The hydrogenation of benzoyl chloride

In a 1-liter round-bottomed flask fitted with a condenser, stirrer and dropping funnel is placed 200 ml. of anhydrous ethyl ether and 128 g. (1.00 mole) of sodium trimethoxyborohydride. To the stirred suspension is added a solution of 70 g. benzoyl chloride (0.50 mole) dissolved in anhydrous ethyl ether. A vigorous reaction ensues. The acid chloride should be added to the hydrogenation agent slowly, at such a rate that the ether refluxes gently. After the acid chloride has been added, the mixture is permitted to stand for 1 hour and 200 ml. of water is added. The reaction mixture is then poured into a separatory funnel, the ether layer is separated and dried with calcium hydride. The ether is removed on a steam cone and the benzyl alcohol is obtained by distillation under vacuum. The product yield is 49 g., B. P. 93–96° at 11 mm., $n_D^{25}$ 1.5375. The yield is 90% of the theoretical.

By addition of sodium trimethoxyborohydride (1.00 mole) to benzoyl chloride (1.00 mole) in ether at 0°, benzaldehyde is formed. The benzaldehyde is conveniently recovered as its bisulfite addition compound. It was converted into the phenylhydrazone, M. P. 154–156°.

The hydrogenation of n-butyric anhydride

In a 1-liter round-bottomed flask is placed 19 g. sodium borohydride (0.50 mole) or 128 g. sodium trimethoxyborohydride (1.0 mole) and 100 ml. of n-butyl ether. To the reaction mixture is added 79 g. of n-butyric anhydride in 100 ml. of n-butyl ether. The mixture is heated under reflux for 4 hours. The reaction mixture is allowed to cool, and 200 ml. of a dilute aqueous solution of sulfuric acid is added to decompose excess borohydride. When hydrogen is no longer given off, the n-butyl ether layer is separated. The ether layer is treated with 200 ml. of a 6M solution of sodium hydroxide. The aqueous extract is acidified with sulfuric acid. The upper layer is taken up in ether, dried with calcium sulfate and distilled at atmospheric pressure. There is obtained 26 g. of n-butyric acid, B. P. 161–163°, $n_D^{20}$ 1.3980. The yield is 60% of theoretical. The n-butyl ether layer (from which the acid has been extracted) is dried with calcium sulfate and distilled through a 30 cm. column, packed with 3/36 stainless steel helices. There is obtained 20 g. n-butyl alcohol, B. P. 114–117°, $n_D^{25}$ 1.3980. The yield is 55% of theoretical. Only one of the two carbonyl groups in the anhydride undergoes reduction. In the case of cyclic anhydrides, such as phthalic anhydride or succinic anhydride, the hydrogenation affects only one of the two carbonyl groups in a similar manner and results in the formation of butyrolactone, B. P. 197–200° and phthalide, M. P. 70–72°, in yields of 40–60%.

The hydrogenation of ethyl benzoate

In a 1-liter round-bottomed flask, fitted with stirrer, condenser and dropping funnel, is placed 4.4 g. of lithium borohydride (0.2 mole) in 100 ml. tetrahydrofuran and the reaction mixture is heated under reflux for eight hours. The tetrahydrofuran is distilled off at atmospheric pressure and 100 g. ethyl ether is added. Water is carefully added to destroy the unreacted borohydride. The ether layer is separated from the aqueous layer dried over calcium sulfate, and the ether removed on a steam cone. The product is distilled under reduced pressure through a flask containing a Vigreaux side arm. The yield is 13 g. of benzyl alcohol, B. P. 93–96° at 11 mm., $n_D^{25}$ 1.5373. The yield is 60% of theoretical.

The hydrogenation of ethyl benzoate

The ethyl benzoate, 30 g. (0.2 mole) is added to the sodium trimethoxyborohydride, 32 g. (0.25 mole) suspended in 200 ml. n-butyl ether. The reaction mixture is refluxed for 10 hours. At the end of this time, water is added and the ether layer is separated and distilled through an efficient column. There is obtained 9.5 g. (B. P. 93–96° at 11 mm., $n_D^{25}$ 1.5373) of benzyl alcohol, a yield of 45%.

The hydrogenation of p-nitrobenzaldehyde

The remarkable selectivity of the reagent is illustrated by the hydrogenation of p-nitrobenzaldehyde.

The p-nitrobenzaldehyde is dissolved in methanol and the sodium borohydride is added in small quantities in the molar ratio $1NaBH_4 : 4p\text{-}NO_2C_6H_4CHO$. The reaction mixture is maintained between 0 and 10° for four hours. Water is then added and the organic layer is separated and crystallized from ligroin. From 15 g. of the aldehyde (0.10 mole) there is obtained 12 g. of p-nitrobenzyl alcohol, M. P. 93°, a yield of 80%. No reduction of the nitro group occurs under these conditions.

The hydrogenation of p-cyanoacetophenone

The hydrogenation of p-cyanoacetophenone may be carried out by a procedure identical with that described above. The product is recrystallized from ligroin. From 14.6 g. of the ketone there is obtained 10 g. of p-cyanophenylmethylcarbinol, B. P. 140–144° at 6 mm., $n_D^{20}$ 1.5480 a yield of 65%. No reduction of the cyano group occurs under these conditions.

The hydrogenation of monoethylsuccinate acid chloride

Sodium trimethoxyborohydride suspended in ether is treated with the monoethylsuccinate acid chloride dissolved in ether by the procedure previously described for hydrogenating benzoyl chloride with sodium trimethoxyborohydride. The two reactants are used in the molar ratio, $2NaBH(OCH_3)_3 : 1C_2H_5OCOCH_2CH_2COCl$. After treatment with water, the ether layer is dried and distilled. Butyrolactone, B. P. 197–200°, $n_D^{25}$ 1.4347 is obtained in yields of 45–55%.

The hydrogenation of acetone

Solid sodium borohydride was added to acetone in the presence of water. The reaction was quite rapid and the final product was predominantly isopropyl alcohol with some pinacols being formed. The formation of pinacols indicated that a certain degree of condensation occurred.

The hydrogenation of methyl ethyl ketone

A solution of 3 to 4 grams of lithium borohydride in 95 grams of diethyl ether was placed in a 500 cc. three-necked flask equipped with reflux condenser, dropping funnel, and mechanical stirrer, and protected from moisture until completion of the reaction by calcium chloride tubes attached to the openings. Through the dropping funnel, 33.2 grams of methyl ethyl ketone was introduced at a rate such as to produce gentle reflux. One hour after the last of the ketone had been added and with continued stirring, 115 cc. of a 15% hydrochloric acid solution was slowly added. The aqueous layer was saturated with sodium chloride. After separation of the ether layer, the aqueous layer was washed twice with ether. The product obtained after evaporation of the ether from the dried ether layer was fractionally distilled in a Vigreaux column, whereupon 33.7 grams (a 92% yield) of butanol-2 (B. P. 98.5) (749 mm.)) was secured.

The hydrogenation of methyl laurate

A solution of 3 to 4 grams of lithium borohydride in 72 grams of diethyl ether was placed in the apparatus described in the preceding paragraph and 31.7 grams of methyl laurate was added. There was no immediate reaction, but after stirring for a few minutes, sufficient heat was evolved to cause the solution to boil. The mixture was refluxed (heating with a Glas-Col) with continuous stirring for six hours. After cooling with an ice bath, 100 cc. of 10% sulfuric acid was slowly added. The ether layer was separated, dried, and the ether evaporated off. Last traces of moisture were removed from the product by heating at 80° C. and 15 mm. pressure. Lauryl alcohol was obtained with a M. P. of 22.5–23° and in a yield of 97%.

The hydrogenation of cinnamaldehyde

In a small tube connected to a high vacuum apparatus is placed 2.3 g. of sodium hydride (0.1 mole) and 14.7 g. (0.15 mole) of triethylboron is added in several small portions, each portion being added only after the previous material had reacted. When no further reaction is observed, the volatile material is removed—it consists of 4.9 g. of triethylboron. To the product in the tube, sodium triethylborohydride, is added 20 ml. of ether and 13. 2 g. (0.1 mole) cinnamaldehyde. A vigorous reaction ensues. Nitrogen is introduced into the tube and it is removed from the vacuum apparatus, and then water and dilute acid are added to hydrolyze the product. The upper layer is separated, dried with anhydrous magnesium sulfate, and distilled in a small Claisen flask in a nitrogen atmosphere. After the fractions of ether and triethylboron are removed, the product, cinnamyl alcohol, $n_D^{20}$ 1.5825, is collected at 130–140° at 13 mm.

Other and similar reductions and hydrogenations with alkali metal borohydrides have been described in the literature. Thus, the Journal of the American Chemical Society, vol. 71 at pages 122 and 3247 discuss reductions with alkali metal borohydrides including the following: n-heptaldehyde to n-heptanol, benzaldehyde to benzyl alcohol, crotonaldehyde to crotyl alcohol, methyl ethyl ketone to s-butanol, benzophenone to benzhydrol, n-butyl palmitate to n-hexadecanol, ethyl benzoate to benzyl alcohol, ethyl sebacate to decamethylene glycol, beta-benzoylpropionic acid to gamma-phenylbutyrolactone, ethyl levulinate to gamma-valerolactone, m-nitroacetophenone to a-(m-nitrophenyl)-ethanol, acetonyl-acetone to hexanediol-2, 5, n-butyraldehyde to n-butanol, chloral hydrate to 2,2,2-trichloroethanol, cyclopentanone to cyclopentanol, diacetyl to butanediol-2, 3, levulinic acid to gamma-valerolactone, mesityl oxide to 4-methyl-3-pentenol-2, anisaldehyde to anisyl alcohol, benzil to hydrobenzoin, bromoacetophenone to styrene bromohydrin, cinnamaldehyde to cinnamyl alcohol, dicyclohexyl ketone to dicyclohexylcarbinol, p-dimethylaminobenzaldehyde to p-dimethylaminobenzyl alcohol, m-hydroxybenzaldehyde to m-hydroxylbenzyl alcohol, m-nitrobenzaldehyde to m-nitrobenzyl alcohol, benzoyl chloride to benzyl alcohol, n-butyryl chloride to n-butanol, cinnamoyl chloride to hydrocinnamyl alcohol, monoethyl succinate acid chloride to butyrolacetone, palmitoyl chloride to cetyl alcohol, and o-phthalyl chloride to phthalide.

The alkali metal borohydrides like aluminum containing hydrides described and claimed in the H. I. Schlesinger and A. E. Finholt application Serial No. 752,286, filed June 3, 1947, which issued as Patent No. 2,576,311 on November 27, 1951, are effective in solution, react rapidly, produce good yields, avoid side reactions in the case of many organic substances and are effective at room temperatures at which many other agents do not react. Although the borohydrides are much like the corresponding aluminum compounds as reducing agents, there are important differences. Thus, the borohydrides may be used in water or in alcohols in which the aluminum compounds react violently and may also be used with amines and with liquid ammonia. The borohydrides are generally more stable than the aluminohydrides and can be used over a wider range of temperatures. For example, sodium borohydride is stable thermally at 400° C., whereas lithium aluminum hydride decomposes rapidly at temperatures of about 175–200° C.

The terms "hydrogenation" and "reduction" are used interchangeably herein.

Having described our invention together with certain embodiments thereof, it is our intention that the invention be not limited by any of the details of description unless otherwise specified, but rather be construed broadly within its spirit and scope as set out in the accompanying claims.

We claim:

1. In the reduction of a chemical compound containing a reducible functional group including an atom other than hydrogen and carbon, the step which comprises associating the compound with an alkali metal borohydride at a temperature sufficient to cause a chemical reaction but sufficiently low that said borohydride does not substantially thermally decompose during the reduction, said borohydride having the formula $MBH_{4-x}A_x$ wherein M is an alkali metal, $x$ is a whole number less than four including zero, and A is a member of the class consisting of an inert and relatively non-reactive atom and radical.

2. The method of claim 1 wherein the alkali metal of the borohydride is sodium.

3. The method of claim 1 wherein the alkali metal of the borohydride is lithium.

4. The method of claim 1 wherein the alkali metal of the borohydride is potassium.

5. The method of claim 1 wherein the chemical compound contains a carbonyl functional group.

6. In the reduction of a chemical compound containing a reducible functional group including an atom other than hydrogen and carbon, the step which comprises associating the compound with an alkali metal borohydride in a liquid carrier and at a temperature sufficient to cause a chemical reaction but sufficiently low that said borohydride does not substantially thermally decompose during the reduction, said borohydride having the formula $MBH_{4-x}A_x$ wherein M is an alkali metal, $x$ is a whole number less than four including zero, and A is a member of the class consisting of an inert and relatively nonreactive atom and radical.

7. The method of claim 6 wherein the alkali metal of the borohydride is sodium and the carrier is an ether in which the alkali metal borohydride is suspended.

8. The method of claim 6 wherein the alkali metal of the borohydride is sodium and the carrier is a polar solvent for the alkali metal borohydride.

9. The method of claim 6 wherein the carrier is water in which the borohydride is at least partially soluble.

10. The method of claim 6 wherein the alkali metal of the borohydride is lithium and the carrier is an ether in which the alkali metal borohydride is dissolved.

11. The method of claim 6 wherein the carrier is an amine in which the borohydride is at least partially soluble.

12. The method of claim 6 wherein the carrier is an alcohol in which the borohydride is at least partially soluble.

13. In the reduction of a hydrocarbon derivative compound containing a carbonyl functional group, the step which comprises associating said compound with an alkali metal borohydride at a temperature sufficient to cause a chemical reaction but sufficiently low that said borohydride does not substantially thermally decompose during the reduction and in the presence of a carrier for the borohydride, said borohydride having the formula $MBH_{4-x}A_x$ wherein M is an alkali metal, $x$ is a whole number less than four including zero, and A is a member of the class consisting of an inert and relatively non-reactive atom and radical.

14. In the reduction of a hydrocarbon derivative compound containing an aldehyde functional group, the step which comprises associating said compound with an alkali metal borohydride at a temperature sufficient to cause a chemical reaction but sufficiently low that said borohydride does not substantially thermally decompose during the reduction and in the presence of a carrier for the borohydride, said borohydride having the formula $MBH_{4-x}A_x$ wherein M is an alkali metal, $x$ is a whole number less than four including zero, and A is a member of the class consisting of an inert and relatively non-reactive atom and radical.

15. In the reduction of a hydrocarbon derivative compound containing a ketone functional group, the step which comprises associating said compound with an alkali metal borohydride at a temperature sufficient to cause a chemical reaction but sufficiently low that said borohydride does not substantially thermally decompose during the reduction and in the presence of a carrier for the borohydride, said borohydride having the formula $MBH_{4-x}A_x$ wherein M is an alkali metal, $x$ is a whole number less than four including zero, and A is a member of the class consisting of an inert and relatively non-reactive atom and radical.

16. In the reduction of a hydrocarbon derivative compound containing an ester functional group, the step which comprises associating said compound with an alkali metal borohydride at a temperature sufficient to cause a chemical reaction but sufficiently low that said borohydride does not substantially thermally decompose during the reduction and in the presence of a carrier for the borohydride, said borohydride having the formula $MBH_{4-x}A_x$ wherein M is an alkali metal, $x$ is a whole number less than four including zero, and A is a member of the class consisting of an inert and relatively non-reactive atom and radical.

17. In the reduction of a hydrocarbon derivative compound containing an acid anhydride functional group, the step which comprises associating said compound with an alkali metal borohydride at a temperature sufficient to cause a chemical reaction but sufficiently low that said borohydride does not substantially thermally decompose during the reduction and in the presence of a carrier for the borohydride, said borohydride having the formula $MBH_{4-x}A_x$ wherein M is an alkali metal, $x$ is a whole number less than four including zero, and A is a member of the class consisting of an inert and relatively non-reactive atom and radical.

18. In the reduction of a hydrocarbon derivative compound containing an acid halide functional group, the step which comprises associating said compound with an alkali metal borohydride at a temperature sufficient to cause a chemical reaction but sufficiently low that said borohydride does not substantially thermally decompose during the reduction and in the presence of a carrier for the borohydride, said borohydride having the formula $MBH_{4-x}A_x$ wherein M is an alkali metal, $x$ is a whole number less than four including zero, and A is a member of the class consisting of an inert and relatively non-reactive atom and radical.

19. In the reduction of a chemical compound containing a reducible functional group including an atom other than hydrogen and carbon, said compound being reducible in an aqueous solution, the step which comprises associating the compound with an alkali metal borohydride in an alkaline medium at a temperature sufficient to cause a chemical reaction but sufficiently low that said borohydride does not substantially thermally decompose during the reduction, said borohydride having the formula $MBH_{4-x}A_x$ wherein M is an alkali metal, $x$ is a whole number less than four including zero, and A is a member of the class consisting of an inert and relatively non-reactive atom and radical.

20. In the reduction of a chemical compound containing a reducible functional group including an atom other than hydrogen and carbon, the step which comprises associating the compound with an alkali metal borohydride in a nonaqueous medium at a temperature sufficient to cause a chemical reaction but sufficiently low that said borohydride does not substantially decompose during the reduction, and then hydrolyzing the resulting product, said borohydride having the formula $MBH_{4-x}A_x$ wherein M is an alkali metal, $x$ is a whole number less than four including zero, and A is a member of the class consisting of an inert and relatively non-reactive atom and radical.

21. In the reduction of a chemical compound containing a reducible functional group including an atom other than hydrogen and carbon, the step which comprises associating the compound with an alkali metal borohydride at a temperature sufficient to cause a chemical reaction but sufficiently low that said borohydride does not substantially decompose during the reduction, said compound being liquid at the reaction temperature and serving as a carrier for the borohydride, said borohydride having the formula $MBH_{4-x}A_x$ wherein M is an alkali metal, $x$ is a whole number less than four including zero, and A is a member of the class consisting of an inert and relatively non-reactive atom and radical.

References Cited in the file of this patent

UNITED STATES PATENTS

| Number | Name | Date |
| --- | --- | --- |
| 2,534,533 | Schlesinger et al. | Dec. 19, 1950 |
| 2,576,311 | Schlesinger et al. | Nov. 27, 1951 |